(No Model.)
J. S. SELLON.
AUTOMATIC SWITCH FOR SECONDARY BATTERIES.
No. 382,112. Patented May 1, 1888.
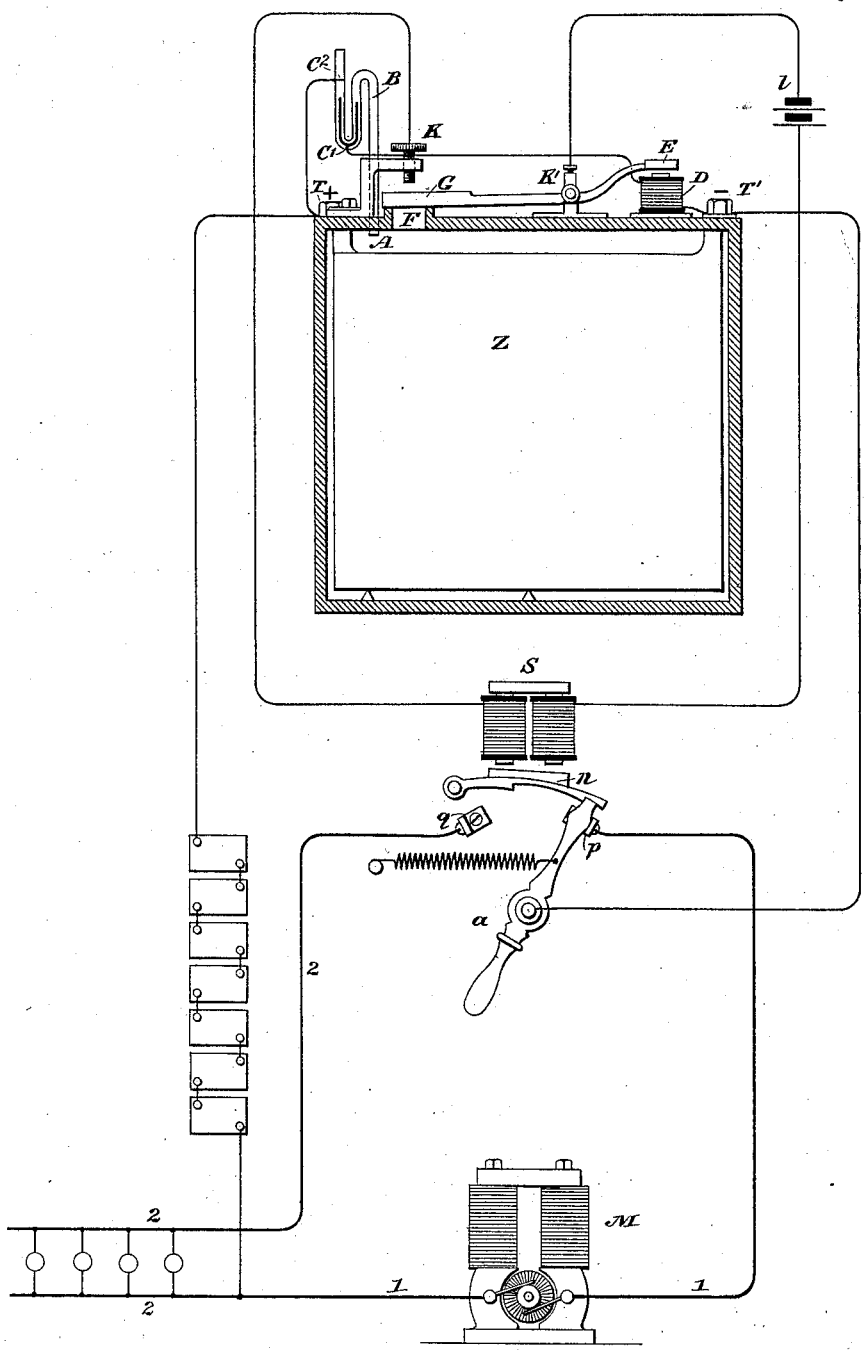
Witnesses
Geo. W. Breck
Carrie E. Ashley
Inventor
John S. Sellon
By his Attorney
Wm. B. Vanuize

United States Patent Office.

JOHN S. SELLON, OF HATTON GARDENS, COUNTY OF MIDDLESEX, ENGLAND, ASSIGNOR TO THE ELECTRICAL ACCUMULATOR COMPANY, OF NEW YORK.

AUTOMATIC SWITCH FOR SECONDARY BATTERIES.

SPECIFICATION forming part of Letters Patent No. 382,112, dated May 1, 1888.

Application filed August 30, 1887. Serial No. 248,261. (No model.) Patented in England January 13, 1883, No. 217; in France June 20, 1883, No. 156,156, and in Germany July 17, 1883, No. 27,868.

*To all whom it may concern:*

Be it known that I, JOHN SCUDAMORE SELLON, a subject of the Queen of Great Britain and Ireland, residing at Hatton Gardens, county of Middlesex, England, have invented certain new and useful Improvements in Automatic Switches for Secondary Batteries or Accumulators, (for which I have obtained Letters Patent in Great Britain, No. 217, dated January 13, 1883; in France June 20, 1883, No. 156,156, and in Germany July 17, 1883, No. 27,868,) of which the following is a specification.

My invention consists in so constructing one or more of a series of cells, or a portion of a cell, that it or they shall be sufficiently gas or air tight to render the pressure of the gas or gases resulting from full or overcharge of utility in working a lever or a valve, or a receptacle containing any substance or material which can be compressed, moved, or expanded by pressure or by the action of the gases in such a manner that each cell or set of cells may be controlled, cut out of the charging-circuit, and replaced again as required. I prefer to employ a circuit-closer consisting of mercury in a bent tube, and an electro-magnetic switch operated thereby to change the connections of the battery with respect to the charging and the working circuits. This construction is shown in the drawing.

Z is a secondary cell having its terminals at T and T'. It is substantially air-tight, and its cover is perforated at A. There is placed over the perforation a tube of insulating material, B, having turns or bends arranged substantially as shown. In the wall of this tube, at a short distance apart, are two metallic contact-points, $c'$ $c^2$. Within the tube is placed conducting material in sufficient quantity to fill the tube between points $c'$ and $c^2$. I prefer to use mercury for this purpose.

D is an electro-magnet having an armature, E, upon the end of a lever, G, pivoted at K'. The free end of G is flattened to cover an aperture or escape, F, in the cover of the cell. Contact-point $c'$ is connected to terminal T. Point $c^2$ is connected to terminal T' through electro-magnet D.

K is an insulated contact-point. M is the charging-dynamo feeding into circuit 1. S is an electro-magnetic switch having an armature, $n$, fixed to a notched bar. $a$ is a spring-retracted pivoted arm making contact with points $p$ and $q$. The magnet of switch S is in a local circuit with contact-points K K' and battery 1. Pivoted arm $a$ is connected to one terminal of the series of secondary cells. Point $q$ is connected to one terminal of the working-circuit. Point $p$ is connected to one terminal of the charging-circuit. The other terminals of the charging-circuit, the working-circuit, and of the series of cells are connected together.

The apparatus operates as follows: The dynamo M is started. Arm $a$ is moved into contact with point $p$, where it is held by the notched arm $n$, as shown. When the cell Z becomes fully charged, gas is generated which accumulates in tube B, and the pressure soon becomes sufficient to force the movable conductor—the mercury—toward the free end of tube B, where it forms contact between $c'$ and $c^2$, completing circuit through magnet D. This magnet attracts its armature-lifting bar G from the escape or aperture F. The gas escapes and the mercury resumes its position in the lowest bend of tube B; but the attraction of armature E has brought the bar G into contact with stop K, and circuit is formed via K K', 1, and S, causing S to attract its armature $n$ and release pivoted arm $a$, which is retracted by its spring into contact with point $q$, thus breaking the charging-circuit at $p$ and closing the working-circuit at $q$, circuit being from battery via $a$, $q$, 2, translating devices, to battery. When the battery is again ready for charging, the switch $a$ is again set and the operation repeated.

What I claim, and desire to secure by Letters Patent, is—

1. The combination of a secondary battery, a charging-circuit, a working-circuit, and a switch for transferring the battery from one circuit to the other, a magnet for operating said switch, and a device for opening and closing the circuit of said magnet operated by the accumulation of gas due to the decomposition of the electrolytic liquid.

2. The combination of a secondary battery, electro-magnetic-switch mechanism therefor in an electric circuit, with a circuit-closer consisting of two insulated electrical contacts in a tube connected with a cell of said battery, and a globule or cylinder of mercury operated by variations in the pressure of gas in said tube to make or break said electric circuit.

3. The combination of an electrolytic cell having means for confining the generated gas or gases, a receptacle containing a conducting material operated by the pressure of the confined gas to connect the terminals of an electric circuit, and an electro-magnet operating an escape-valve.

4. The combination of an electrolytic cell having means for confining the generated gas or gases, a receptacle containing a conducting material operated by the pressure of the confined gas to connect the terminals of an electric circuit, and an electro-magnet controlling the local circuit containing an electro-magnetic switch operating to disconnect the battery from the charging-dynamo.

5. The combination of a secondary-battery cell having means for confining the generated gas or gases, a receptacle containing a conducting material operated by the pressure of the confined gas to connect the terminals of an electric circuit, and an electro-magnet controlling a local circuit containing an electro-magnetic switch operating to disconnect the battery from the charging-dynamo and connect it with the working-circuit.

Signed at London, in the county of Middlesex, this 13th day of August, 1887.

JOHN S. SELLON.

Witnesses:
   JOHN NEWTON,
   WM. JOHN WEEKS,
      *Both of 9 Birchin Lane, London.*